United States Patent [19]
Sumi et al.

[11] Patent Number: 5,705,067
[45] Date of Patent: Jan. 6, 1998

[54] MIXING FAUCET WITH WATER PURIFIER

[75] Inventors: Yukihiko Sumi, Gifu; Shuji Nakayama, Ikoma, both of Japan

[73] Assignees: Kitamuragokin Ind. Co., Ltd., Yamagata; Matsushita Electric Ind. Co., Ltd., Kadoma, both of Japan

[21] Appl. No.: 680,236

[22] Filed: Jul. 11, 1996

[51] Int. Cl.$^6$ .................. B01D 35/02; B01D 35/30
[52] U.S. Cl. .................. 210/234; 210/235; 210/282; 210/449; 210/266
[58] Field of Search .................. 210/266, 282, 210/449, 234, 235

[56] References Cited

U.S. PATENT DOCUMENTS

| | | | |
|---|---|---|---|
| 4,277,332 | 7/1981 | Baughn | 210/266 |
| 4,684,461 | 8/1987 | Alhauser | 210/282 |
| 4,732,674 | 3/1988 | Tamura et al. | 210/266 |
| 5,017,286 | 5/1991 | Heiligman | 210/266 |
| 5,071,551 | 12/1991 | Muramatsu | 210/266 |
| 5,151,179 | 9/1992 | Bach et al. | 210/282 |
| 5,160,038 | 11/1992 | Harada et al. | 210/266 |
| 5,192,436 | 3/1993 | Sasaki et al. | 210/282 |
| 5,397,462 | 3/1995 | Higashijima | 210/136 |
| 5,525,214 | 6/1996 | Hembree | 210/88 |

FOREIGN PATENT DOCUMENTS

| | | |
|---|---|---|
| 4-210287 | 7/1992 | Japan . |
| 5-14743 | 2/1993 | Japan . |
| 5-28487 | 4/1993 | Japan . |
| 5-203071 | 8/1993 | Japan . |

*Primary Examiner*—Cynthia L. Nessler
*Attorney, Agent, or Firm*—Wenderoth, Lind & Ponack

[57] ABSTRACT

A body 1 is constructed by mounting a purifier cartridge 23 in a cold-water passage 7 and is equipped with a purified water handle 16 for opening and closing a branch passage leading from the cold-water passage 7 to the purifier cartridge 23. To this body, there is mounted a base 9 which includes a valve functioning part 11 for adjusting the mixing of cold water and hot water coming through the cold-water passage 7 and a hot-water passage 8, and the flow rates of the cold water, the hot water and the mixed water by operating a lever 15. A spout 10 spouts therefrom the cold water, the hot water, their mixed water adjusted by the valve functioning part 11, or the purified water. The purified water handle 16 and the valve functioning part 11 are provided separately, and hence they can be individually replaced when they fail. The valve functioning part 11 and the base 9 can be commonly used with the corresponding parts of an ordinary mixing faucet and can be operated independently of each other to improve their operability drastically.

11 Claims, 5 Drawing Sheets

MIXING FAUCET WITH WATER PURIFIER

BACKGROUND OF THE INVENTION

1. Field of the Invention

The present invention relates to a mixing faucet with a water purifier, in which a purifier cartridge is integrally assembled in a mixing faucet to be mounted in a sink or the like.

2. Description of the Prior Art

A mixing faucet with a water purifier of this kind is proposed in Japanese Patent Laid-Open No. 210287/1992, as will be described with reference to FIG. 5. Specifically, this mixing faucet with a water purifier is so constructed that a spout 102 is provided to a lower portion of a faucet body 101, a purifier cartridge container 103 is provided above the same, a valve 104 and a lever 105 are provided in the portion opposed to a purifier cartridge container 103, and a purified water spout 106 above the valve 104 and the lever 105. Of these, the valve 104 adjusts the flow rates and mixing of cold water and hot water and opens and closes the passage leading to the purifier cartridge container 103, and the lever 105 is for operating the valve 104.

In such a conventional mixing faucet with a water purifier as described above, however, not only a valve mechanism for opening and closing the passage leading to the purifier cartridge container 103 but also another valve mechanism, which is so frequently operated for adjusting the flow rates and mixing of cold water and hot water that it is liable to fail, are integrally assembled with the valve 104. Moreover, the valve functioning part 104 and the purifier cartridge container 103 are united with the faucet body 101, and the entire faucet body 101 has to be replaced if the valve functioning part 104 becomes faulty. As a result, this mixing faucet has a problem of poor economical efficiency.

As described above, not only the valve mechanism for opening and closing the passage leading to the purifier cartridge container, but also the valve mechanism, which is so frequently operated for adjusting the flow rates and mixing of the cold water and the hot water that it is liable to fail, are integrally assembled with the valve functioning part 104. Moreover, these valve mechanisms and valve functioning part 104 are integrated with the faucet body 101, and this integral structure is further integrated with the spout assembly 102. This makes it impossible to use the parts of an ordinary mixing faucet commonly. Parts of the mixing faucet with a purifier are dedicated, raising another problem in that they increase the cost.

Moreover, the provision of the two spouts raises the cost of the mixing faucet. In addition, the valve functioning part 104 is integrally equipped with the valve mechanism for opening and closing the passage leading to the purifier cartridge container 103 and the valve mechanism for adjusting the flow rates and mixing of the cold water and the hot water, so that the operation of the lever 105 is complicated. Since this lever 105 is positioned sideways, moreover, there arises still another problem: in that the frequent adjustment of the mixing and flow rates of the cold and hot water is troublesome.

Since the purifier cartridge container 103 is attached to the faucet body 101 above the spout lead-out portion of the faucet body 101, moreover, it is located at such a high position that it is conspicuous, spoil the design balance of the entire mixing faucet and obstructs the dish washing work in the sink and/or the work of placing kitchen gadgets at the back of the sink.

OBJECTS AND BRIEF SUMMARY OF THE INVENTION

The objects of the present invention are to solve the above problems. A first object is to improve the economy, the cost performance and the operability of a mixing faucet with a purifier. A second object is to improve the appearance, the workability and the operability of the mixing faucet A third object is to facilitate the replacement of a purifier cartridge, and a fourth object is to prevent the outflow of water at the time of replacing the purifier cartridge.

In order to achieve the above-specified first object, there is provided a mixing faucet with a purifier having a body including a cold-water passage, to which a purifier cartridge is mounted, a hot-water passage, and a purified water handle for opening and closing a branch passage leading from the cold-water passage to the purifier cartridge. A base is removably mounted to the body and includes a valve functioning part for adjusting the mixing of cold water and hot water coming through the cold-water passage and the hot-water passage and the flow rates of the cold water, the hot water or the mixed water by operating a lever, and a spout for spouting therefrom the cold water, the hot water, their mixed water adjusted by the valve functioning part, or the purified water purified by the purifier cartridge.

In order to achieve the second object, the base is rotatably provided above the body, and the valve functioning part is arranged above the base and located in a higher position, whereas the purifier cartridge is located in a lower position.

In order to achieve the third object, the purified water handle is arranged in a suitable position along the outer circumference of the body, whereas the purifier cartridge is removably arranged in a position opposed to the purified water handle. Alternatively, the body further includes a fixing part at its lower portion so that the body may be fixed to the counter of a sink. The purifier cartridge is removably mounted in a suitable position of the outer circumference of the body with a spacing between the body and the fixing part so as to allow insertion of the hand of the user, and a purified water handle is attached to the side opposed to the purifier cartridge.

In order to achieve the fourth object, the mixing faucet further comprises an intermediate member mounted to the body and having a cold-water supply passage communicating with the cold-water passage. The purifier cartridge is removably mounted to the intermediate member, and the cold-water supply passage of the intermediate member has a valve seat hole and an outlet port for discharging the purified water. Further, the mixing faucet has a shutoff valve mounted in the valve seat hole and a valve spindle biased in a normally closed direction. A check valve is mounted in the outlet port, so that when the purifier cartridge is removed from the intermediate member, the valve seat hole and the check valve are closed to prevent cold water and purified water in the body from being discharged to the outside.

Thanks to the aforementioned first construction, according to the present invention, the purified water handle acting as a valve mechanism for opening and closing the branch passage leading to the purifier cartridge is provided separately from the valve functioning part acting as a valve for adjusting the flow rates and mixing of cold and hot waters, so that only the valve functioning part can be replaced if the valve functioning part fails. Moreover, the base including the valve functioning part which is frequently operated and accordingly liable to failure, and the spout are provided separately from the body, so that the valve functioning part and base can be replaced by the corresponding parts of an ordinary mixing faucet, thereby reducing the cost drastically. Moreover, the cost for the mixing faucet can be further reduced to an extent corresponding to the omission of one spout. In addition, the valve functioning part for adjusting the flow rates and mixing of cold and hot water can be operated independently of the operation of opening and closing the branch passage leading to the purifier cartridge, so that the operability of the mixing faucet can be remarkably improved.

BRIEF DESCRIPTION OF THE DRAWINGS

An embodiment of the present invention will now be described with reference to the accompanying drawings, in which.

DETAILED DESCRIPTION OF THE INVENTION

Figure 1:
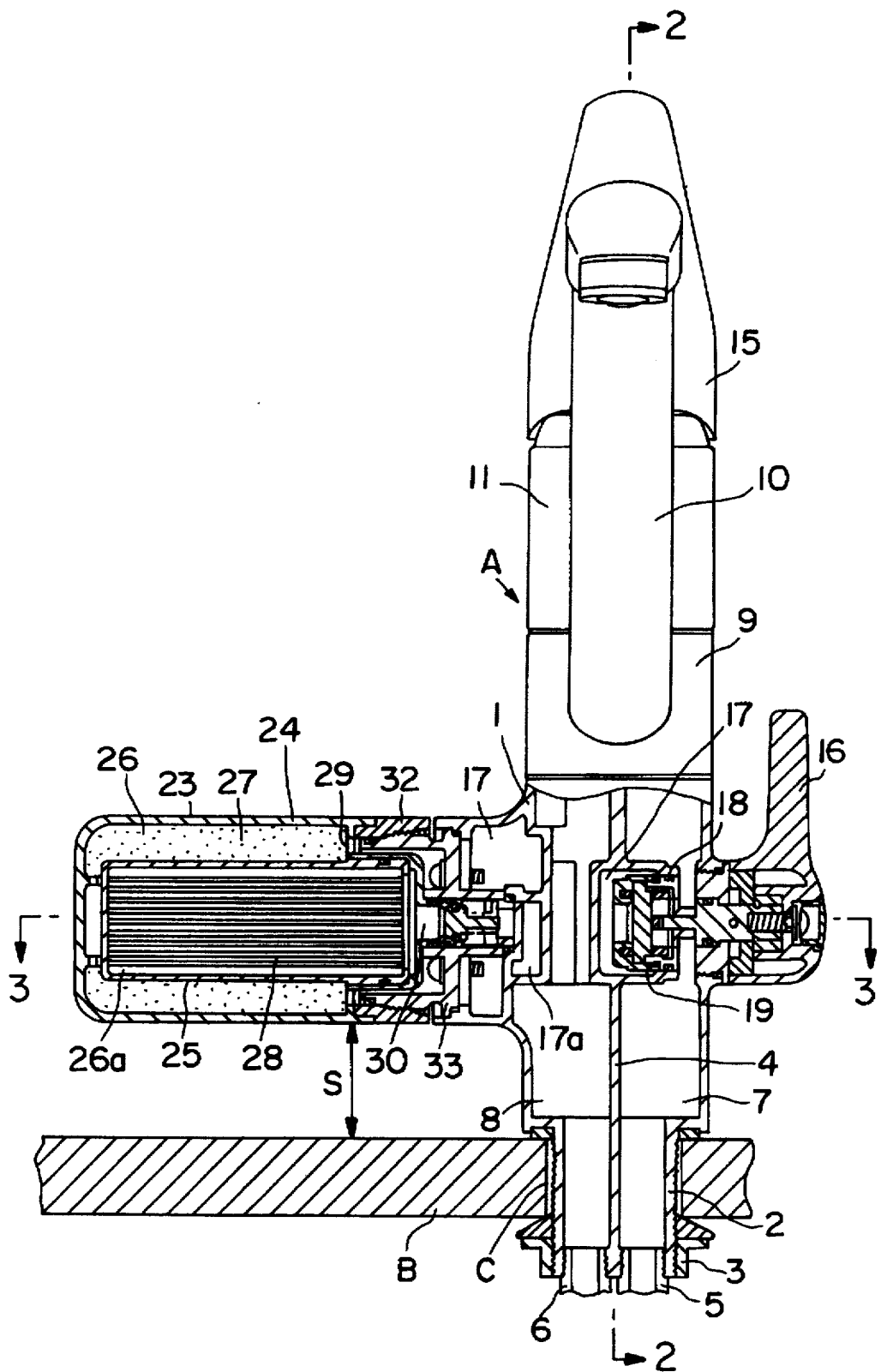
FIG. 1 is a partial section showing a mixing faucet with a water purifier of the present invention.

In the embodiment of the present invention, as shown in FIG. 1, the body 1 of a mixing faucet A is mounted on a counter B of a sink by inserting a fixing part 2, which has a long cylindrical shape and is formed on the circumference of the lower portion of the body 1, into a fixing hole C bored in the counter B, and by screwing a nut 3 from below the counter B on the threaded outer circumference of the fixing part 2. In this fixing part 2, there are fitted in parallel a cold-water supply pipe 5 and a hot-water supply pipe 6 which communicate with a cold-water source and a hot-water source on the upstream side and with a cold-water passage 7 and a hot-water passage 8 defined in the body 1 on the lefthand and righthand sides by a vertical partition 4 on the downstream side. Reference numeral 9 designates a cylindrical base which is rotated on the outer circumference of the body 1 above the cold-water passage 7 and the hot-water passage 8. A spout 10 is extended obliquely upward from the base 9.

Figure 2:
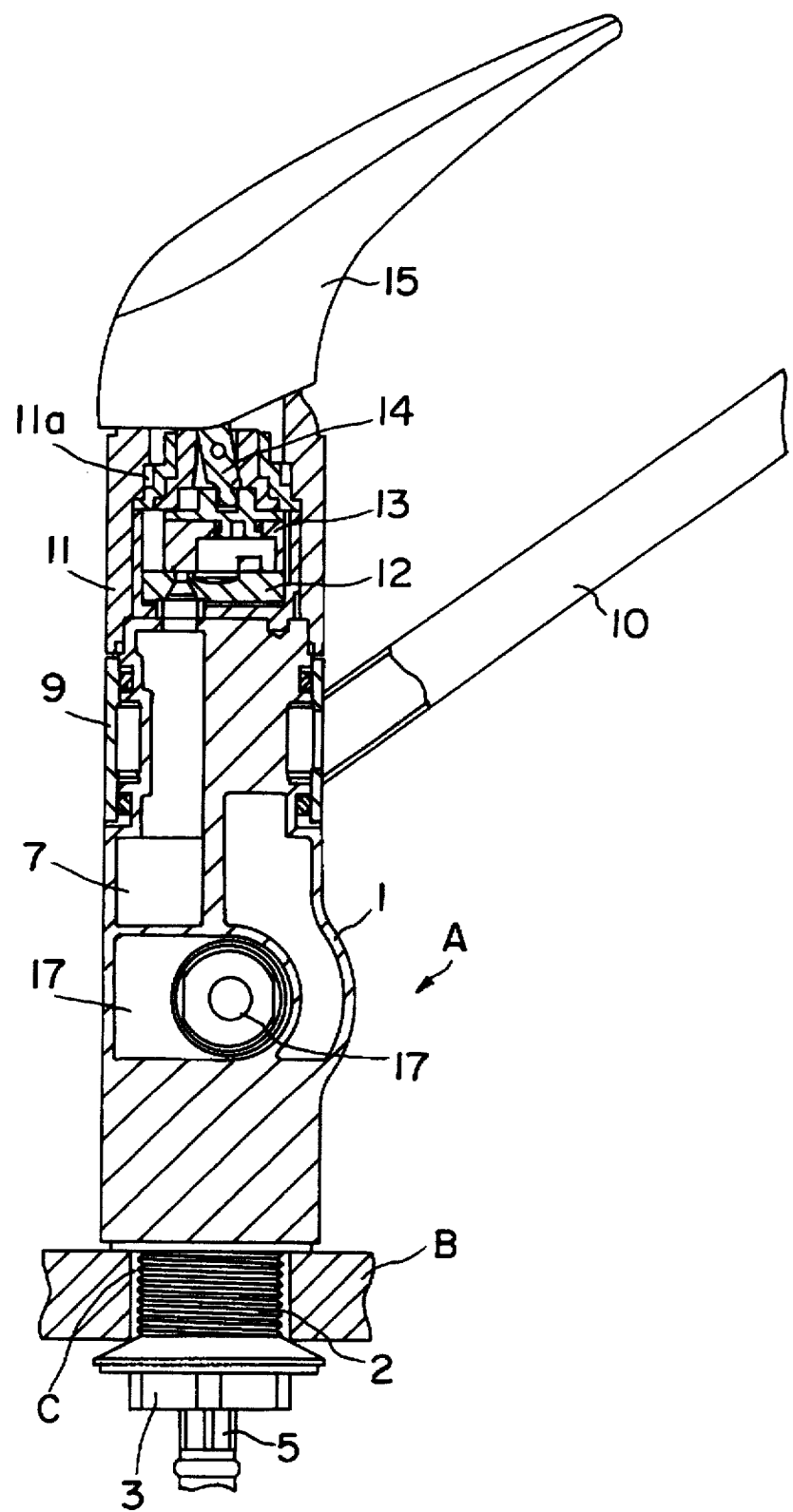
FIG. 2 is a partial section taken along line 2—2 of FIG. 1.

Numeral 11 designates a valve functioning part which is threadedly fastened to the upper portion of the body 1 through the base 9. Inside the valve functioning part 11, as shown in FIG. 2, there is formed a valve chamber 11a which is in communication with the cold-water passage 7 and the hot-water passage 8. A fixed plate 12 formed out of ceramic, and a movable plate 13 made of the same material, are joined together and mounted water-tightly in the valve chamber 11a. The movable plate 13 is connected through a lever shaft 14 to a lever 15 so that hot water, cold water or mixed water thereof is supplied to the spout 10 by changing the correspondence relation of the opening and closing of the movable plate 13 and the fixed plate 12 by operating the lever 15.

On the righthand side of the body 1 and below the base 9 in FIG. 1, there is attached a purified water handle 16 for feeding cold water in the cold-water passage 7 into a later-described purifier cartridge 23 and then into the spout 10.

Figure 3:
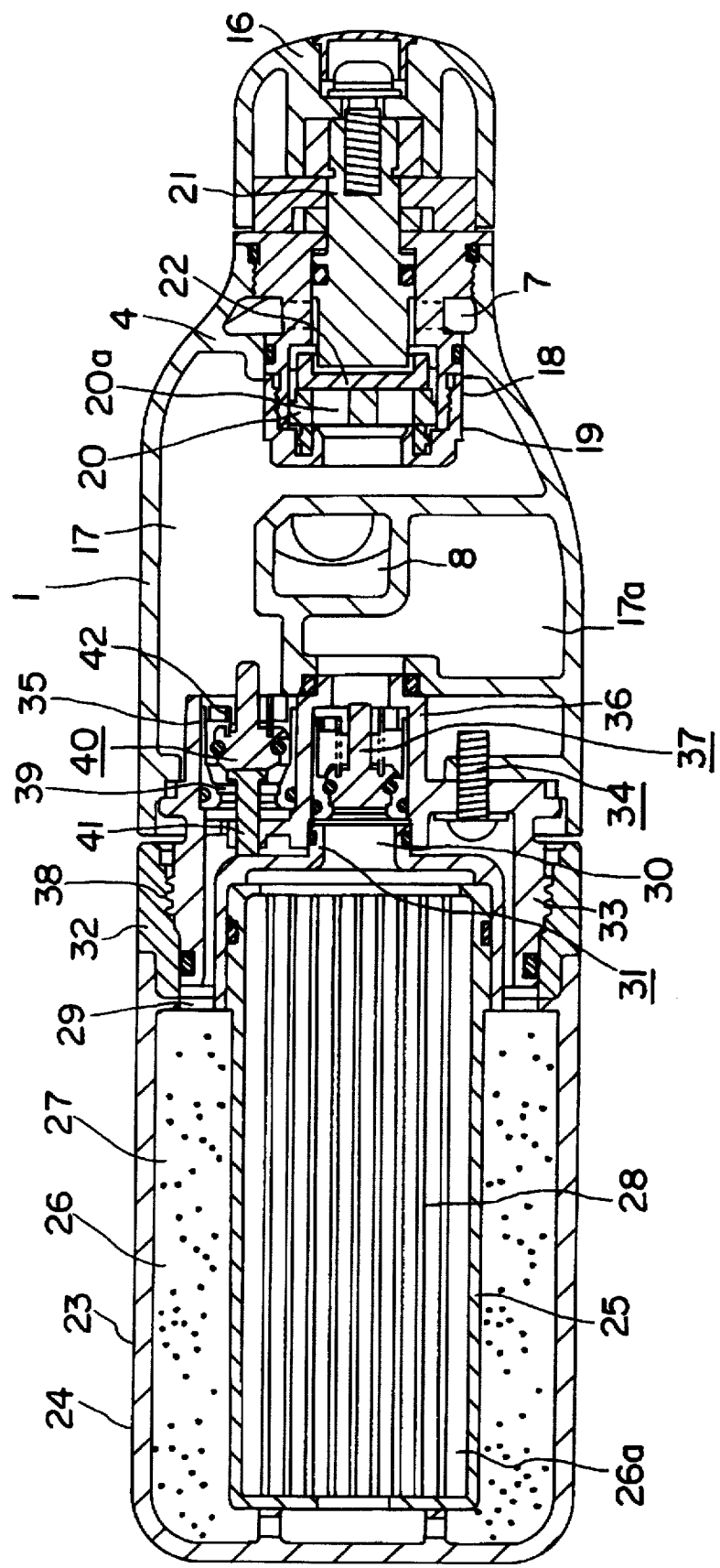
FIG. 3 is an enlarged section taken along line 3—3 of FIG. 1.
Figure 4:
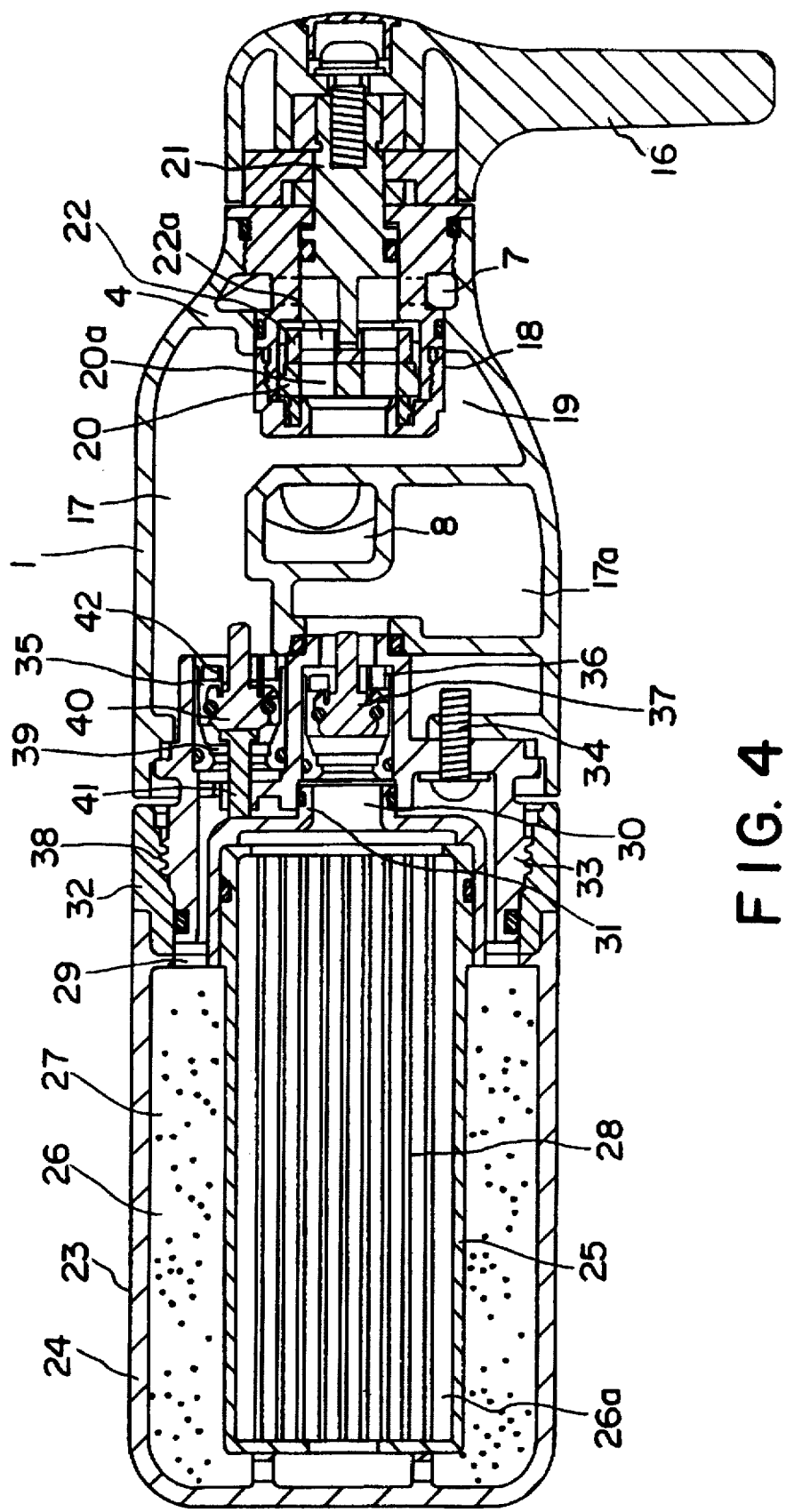
FIG. 4 is an enlarged section similar to FIG. 3 but shows a state in which water is being supplied.
Figure 5:
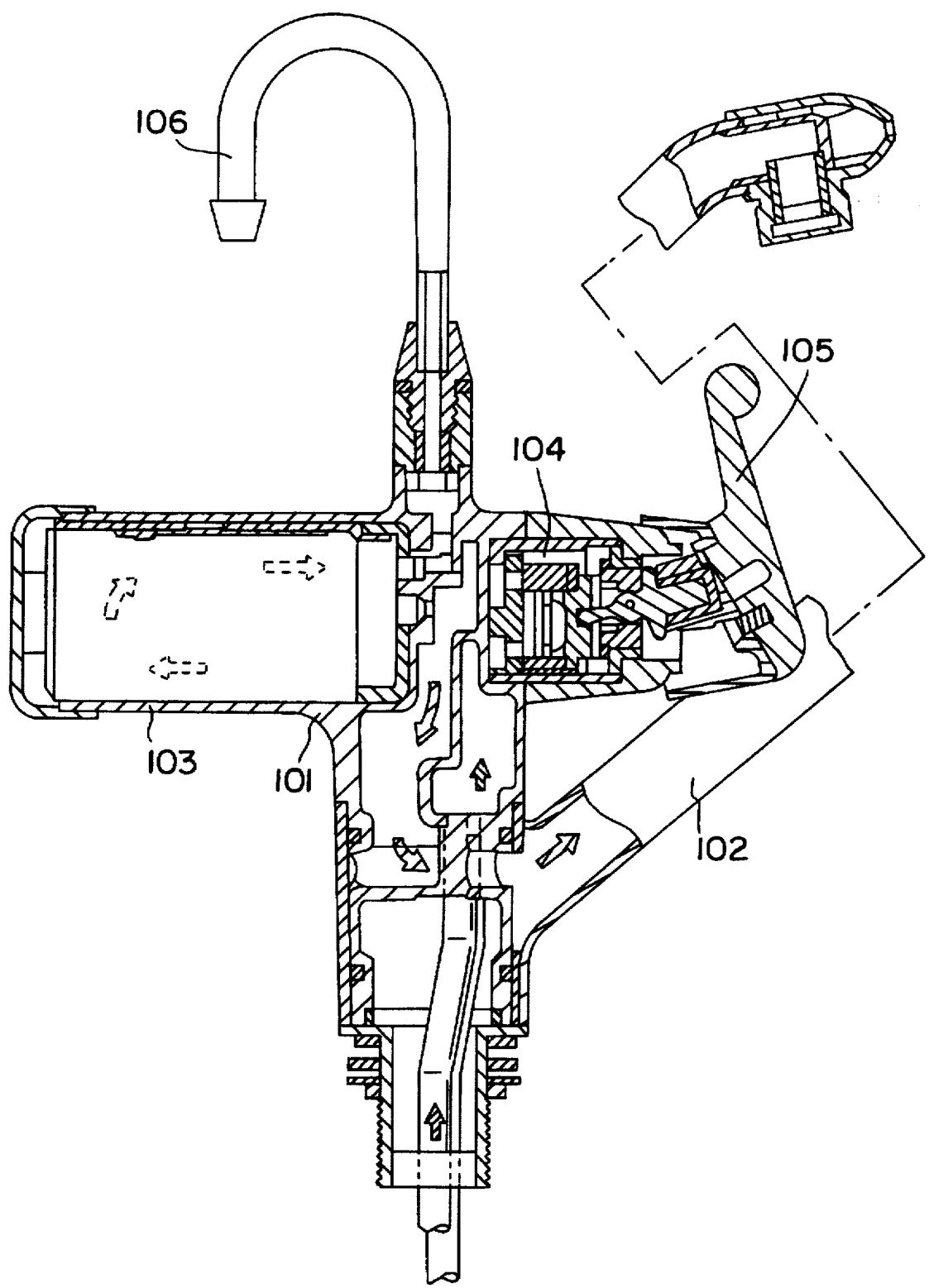
FIG. 5 is a section showing a mixing faucet with a water purifier of the prior art.

Specifically, a first bypass passage 17 communicating with the purifier cartridge 23 on the down-stream is formed in the body 1 and is in communication with the cold-water passage 7 through a valve port 18 which is opened in the partition 4. In a valve unit 19 mounted to the valve port 18, as shown in FIG. 3, there are mounted water-tightly a disc-shaped fixed plate 20 having an outlet port 20a and a rotary plate 22 connected to the purified water handle 16 through a spindle 21 which can be operated to open and close the outlet port 20a of the fixed plate 20. While the outlet port 20a of the fixed plate 20 is closed by the rotary plate 22, the passage from the cold-water passage 7 to the first bypass passage 17 is blocked. When communication of an inlet port 22a in the rotary plate 22 with the inlet port 20a of the fixed plate 20 is established by turning the purified water handle 16, as shown in FIG. 4, cold water in the cold-water passage 7 is fed through the first bypass passage 17 to the purifier cartridge 23.

On the lefthand side of the body 1, as shown in FIG. 1, is located the purifier cartridge 23, which is removably mounted through an intermediate member 33 coaxially with the purifier handle 16. The purifier cartridge 23 has a horizontally elongate cylindrical shape and is attached to the body 1 by providing a spacing S between its outer circumference and the counter B so as to allow insertion of the hand of the user, so that it can be easily turned when it is replaced. In other words, the purifier cartridge 23 is attached to the body 1 while defining the spacing S for allowing the insertion of the user's hand between the counter B and the fixing part 2 of the body 1. The purifier cartridge 23 has a double structure with an outer container 24 and an inner container 25. A water flow chamber 26, defined between the outer container 24 and the inner container 25, is charged with a filtering material 27 of activated charcoal, and another water flow chamber 26a, formed in the inner container 25, is charged with a filtering material 28 of hollow fiber membrane. Thus, cold water is introduced from an inlet port 29 opened in one end of the water flow chamber 26, and made to pass through the activated charcoal 27 and the hollow fiber membrane 28. While the water passes through them, impurities are removed, and purified water is made to flow out from the outlet port 30. Here, the activated charcoal 27 and the hollow fiber membrane 28 may be substituted by other known filtering material, such as a porous ceramic or an ion exchange resin.

The intermediate member 33 is fastened to the body by means of screws 34, as shown in FIG. 3, and has an feed portion 35 for feeding cold water to the inlet port 29 of the purifier cartridge 23 and a discharge portion 36 for discharging the purified water out of the outlet port 30. An annular projection 31 of the purifier cartridge 23 is fitted water-tightly in the discharge portion 36, to which is provided a check valve 37. A nut 32 of the purifier cartridge 23 is screwed on an external thread 38 which is formed on the outer circumference on the intermediate member 33.

The feed portion 35 of the intermediate member 33 feeds cold water of the first bypass passage 17, when the purifier cartridge 23 is mounted, from a valve seat hole 39 to the water flow chamber 26 of the purifier cartridge 23, but shuts off the valve seat hole 39 when the purifier cartridge 23 is demounted from the intermediate member 33, to feed no cold water to the purifier cartridge 23. Specifically, the feed portion 35 is equipped with a shutoff valve 40 which is biased by the biasing force of a spring 42 for opening and closing the valve seat hole 39. When the purifier cartridge 23 is mounted, a valve spindle 41 abuts against the side face of the purifier cartridge 23 so that the shutoff valve 40 is pushed against the action of a spring 42 and is separated from the valve seat hole 39 to allow water from the first bypass passage 17 to the purifier cartridge 23. When this purifier cartridge 23 is demounted from the intermediate member 33, the shutoff valve 40 is biased by the spring 42 to shut off the valve seat hole 39 to prevent the discharge of the cold water from the first bypass passage 17 to the outside.

Here will be described the operation of the mixing faucet A having the above structure. When this mixing faucet A is used as an ordinary faucet, the purified water handle 16, located on the righthand side of the body 1 in FIG. 3, is operated to cause the rotary plate 22 to close the outlet port 20a of the fixed plate 20 to thereby shut off the passage of the cold water from the cold-water passage 7 to the first bypass passage 17. When the lever 15, as shown in FIGS. 1 and 2, is operated in a predetermined direction, the valve functioning part 11 is operated in a predetermined manner to introduce the cold water and hot water at proper flow rates from the cold-water passage 7 and the hot-water passage 8 into the valve chamber 11a so that mixed water at a proper temperature and at a proper flow rate is spouted at the cold- and hot-water mixing ratio determined by the fixed plate 12 and the movable plate 13 from the spout 10.

Next, when purified cold water free of bad odor and impurities is spouted to provide good drinking water, the valve functioning part 11 is held in the water shutoff state by operating the lever 15. The purified water handle 16 is operated in the spouting direction, as shown in FIG. 4. Then, the inlet port 22a of the rotary plate 22 and the outlet port 20a of the fixed plate 20 are brought to face each other so that the cold water of the cold-water passage 7 is fed to the first bypass passage 17. This cold water is cleared of impurities, while it flows through the feed portion 35 of the intermediate member 33 and through both the activated charcoal 27 of the water flow chamber 26 and the hollow fiber membrane 28 in the inner container 25, so that it turns into purified water. This purified water reaches the second bypass passage 17a and opens the check valve 37 of the discharge portion 36, and is spouted from the spout 10.

Here in this mixing faucet with a water purifier, the purified water handle 16, acting as a valve for opening and closing the passage leading to the purifier cartridge 23, and the valve functioning part 11 acting as the valve for adjusting the flow rates and mixing of cold and hot waters, are provided separately from each other. As a result, the valve functioning part 11 can be exclusively replaced by a new one in case the part 11 fails. Moreover, the operation of opening and closing the passage to the purifier cartridge 23 and the operation of the valve functioning part 11 to adjust the flow rates and mixing of cold and hot water can be effected independently of each other, thereby improving the operability of the mixing faucet. Still moreover, the lever 15 for operating the valve functioning part 11 is located at the highest position so that its operation can be facilitated even if frequently operated.

The base 9 having the aforementioned valve functioning part 11 for adjusting the flow rates and mixing of cold and hot water and the spout 10 are provided separately from the body 1 having the purifier cartridge 23 mounted therein and the purified water handle 16 for opening and closing the passage from the cold-water passage 7 to the purifier cartridge 23. The mixing faucet with water purifier is constructed by integrating the base 9 and the body 1. As a result, the valve functioning part 11 and the base 9 can be replaced by the corresponding parts of an ordinary mixing faucet so that the cost can be drastically reduced.

The purifier cartridge 23 is mounted in the body 1, which is located below the valve functioning part 11 and the base 9, so that it is located in a relatively low position. As a result, the purifier cartridge 23 raises no obstruction against the work of washing dishes in the sink or placing kitchen gadgets at the back of the sink. Moreover, the body 1 is mounted on the counter B of the sink or the like. The spacing between the counter B (or the fixing part 2 of body) and the purifier cartridge 23 can admit the hand of the user so that the purifier cartridge 23 can be easily replaced by a new one. Still moreover, the purified water handle 16 raises no obstruction because it is arranged on the side opposed to the purifier cartridge 23.

The present invention has the following advantages:

(1) According to the present invention, a purified water handle for opening and closing the branch passage leading to the purifier cartridge is provided separately from the valve functioning part for adjusting the flow rates and mixing of cold and hot waters, so that the valve functioning part can be replaced in case it fails. Moreover, the base including the valve functioning part is frequency used and, accordingly, liable to fail. The spout is provided separately from the body, so that the valve functioning part and the base can be replaced by the corresponding parts of an ordinary mixing faucet to thereby to reduce the cost drastically. Still moreover, the cost of the mixing faucet can be further reduced to the extent corresponding to one spout. In addition, the valve functioning part for adjusting the flow rates and mixing of cold and hot waters can be operated independently of the operation of opening and closing the passage leading to the purifier cartridge so that the operability of the mixing faucet can be drastically improved.

(2) In the construction in which the base is rotatably provided above the body, and the valve functioning part is arranged above the base and located in a higher position whereas the purifier cartridge is located in the lower position, the valve functioning part can be operated in the highest position to improve operability. The purifier cartridge is located in the relatively low position so that it is not conspicuous and improves the entire balance of the mixing faucet. In addition, the purifier cartridge raises no obstruction against the work of washing dishes in the sink or placing kitchen gadgets at the back of the sink, so that the usability of the mixing faucet can be remarkably improved.

(3) In the construction in which the purified water handle is arranged in a suitable position of the outer circumference of the body whereas the purifier cartridge is removably arranged in a position opposed to the purified water handle, or in the construction in which the body further includes a fixing part for fixing the body to the counter of the sink at the lower portion of the body, the purifier cartridge is removably mounted in a suitable position of the outer circumference of the body with a spacing between the cartridge and the fixing part so as to allow insertion of the hand of the user. The purified water handle is attached to the side opposed to the purifier cartridge. Neither the purified water handle nor the counter of the sink raises any obstruction against the replacement of the purifier cartridge, even if the cartridge is located at the relatively low position, so that the purifier cartridge can be easily replaced by a new one.

(4) In the mixing faucet in which an intermediate member having a cold-water supply passage communicating with the cold-water passage is mounted on the body, a purifier cartridge is removably mounted on the intermediate member, the cold-water supply passage of the intermediate member is provided with a valve seat hole and an outlet port for discharging the purified water, a shutoff valve is mounted in the valve seat hole and has a valve spindle biased in the normally closed direction, and a check valve is mounted in the outlet port. The valve seat hole and the check valve are automatically shut off when the purifier cartridge is replaced so that cold water and the purified water in the body can be prevented from flowing out.

What is claimed is:

1. A mixing faucet and purifier arrangement, comprising:
   a body having a cold water passage and a hot water passage therein, said body having a lower end;
   a purifier cartridge mounted on said body, said purifier cartridge having a fluid inlet and a fluid outlet;
   a branch passage in said body leading from said cold water passage to said fluid inlet of said purifier cartridge;
   a purified water handle connected to a purified water valve that is located so as to be capable of opening said branch passage to and closing said branch passage off from said cold water passage;
   a base that is removably mounted on said body and fluidly connected with said cold water passage and said hot water passage;
   a means on said base for adjusting the mixing of cold and hot water from said cold water passage and said hot water passage and the flow rates of water coming through said cold water passage and said hot water passage under the operation of a lever; and
   a spout fluidly connected with said means on said base and with said fluid outlet of said purifier cartridge for spouting therefrom cold water, hot water, mixed water adjusted by said means on said base and purified water purified by said purifier cartridge.

2. The mixing faucet of claim 1, wherein said body has an outer circumference, said purified water handle is located at a position along said outer circumference, and said purifier cartridge is located at another position along said outer circumference circumferentially opposite said purified water handle.

3. The mixing faucet of claim 1, wherein:
   said body further comprises a lower portion having a connecting portion thereon for mounting said body to a counter of a sink; and
   said purifier cartridge is removably mounted on said outer circumference of said body with a vertical spacing between said purifier cartridge and said connecting portion sufficient to allow a hand to be inserted under said purifier cartridge when said body is mounted to the counter of a sink; and
   said purified water handle is located on said body at a position opposite to said purifier cartridge.

4. The mixing faucet of claim 1, and further comprising:
   an intermediate member mounted on said body, said intermediate member having a cold water supply passage communicating with said cold water passage, said purifier cartridge being removably mounted to said intermediate member, and said cold water supply passage having a valve seat hole and an outlet port for discharging purified water;
   a shutoff valve mounted in said valve seat hole having a valve spindle biased in a direction in which said valve spindle closes said valve seat hole; and
   a check valve mounted in said outlet port such that when said purifier cartridge is removed from said intermediate member said valve seat hole and said check valve are closed to prevent cold water and purified water in said body from being discharged therefrom.

5. The mixing faucet of claim 1, wherein said base is located above said body, said means is located above said base, and said means is located at a position that is higher than said purifier cartridge.

6. The mixing faucet of claim 5, wherein said body has an outer circumference, said purified water handle is located at a position along said outer circumference, and said purifier cartridge is located at another position along said outer circumference circumferentially opposite said purified water handle.

7. The mixing faucet of claim 5, wherein:
   said body further comprises a lower portion having a connecting portion thereon for mounting said body to a counter of a sink;
   said purifier cartridge is removably mounted on said outer circumference of said body with a vertical spacing between said purifier cartridge and said connecting portion sufficient to allow a hand to be inserted under said purifier cartridge when said body is mounted to the counter of a sink; and
   said purified water handle is located on said body at a position opposite to said purifier cartridge.

8. The mixing faucet of claim 5, and further comprising:
   an intermediate member mounted on said body, said intermediate member having a cold water supply passage communicating with said cold water passage, said purifier cartridge being removably mounted to said intermediate member, and said cold water supply passage having a valve seat hole and an outlet port for discharging purified water;
   a shutoff valve mounted in said valve seat hole having a valve spindle biased in a direction in which said valve spindle closes said valve seat hole; and
   a check valve mounted in said outlet port such that when said purifier cartridge is removed from said intermediate member said valve seat hole and said check valve are closed to prevent cold water and purified water in said body from being discharged therefrom.

9. A mixing faucet and purifier arrangement adapted to be mounted to a counter of a sink, comprising:
   a body having a cold water passage and a hot water passage therein, said body having a lower end having a counter connecting portion thereon adapted to connect to a counter of a sink and an upper end having a base connecting portion thereon;
   a purifier cartridge mounted on said body, said purifier cartridge having a fluid inlet and a fluid outlet;
   a branch passage in said body leading from said cold water passage to said fluid inlet of said purifier cartridge;
   a purified water handle connected to a purified water valve that is located so as to be capable of opening said branch passage to and closing said branch passage off from said cold water passage;
   a base that is removably mounted on said base connecting portion of said body and fluidly connected with said cold water passage and said hot water passage;
   a mixing valve on said base having an operating lever connected therewith; and
   a spout fluidly connected with said cold water passage and said hot water passage and to said fluid outlet of said purifier cartridge through said mixing valve on said base for spouting therefrom cold water, hot water, mixed water adjusted by said mixing valve on said base and purified water purified by said purifier cartridge.

10. The mixing faucet of claim 9, wherein said purifier cartridge and said purified water handle are mounted on opposite sides of said body below said base.

11. The mixing faucet of claim 10, wherein said purifier cartridge is horizontally disposed and is vertically spaced from said counter connecting portion by an amount sufficient to allow a hand to be inserted under said purifier cartridge.

* * * * *